United States Patent
Zimmer et al.

(10) Patent No.: US 7,181,610 B2
(45) Date of Patent: Feb. 20, 2007

(54) METHOD AND SYSTEM TO ENCAPSULATE A DRIVER WRITTEN FOR AN OPERATING SYSTEM (OS) RUNTIME ENVIRONMENT IN AN OS INDEPENDENT ENVIRONMENT FIRMWARE EXTENSION

(75) Inventors: Vincent J. Zimmer, Federal Way, WA (US); Michael A. Rothman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 410 days.

(21) Appl. No.: 10/681,505

(22) Filed: Oct. 7, 2003

(65) Prior Publication Data

US 2005/0076196 A1 Apr. 7, 2005

(51) Int. Cl.
*G06F 15/177* (2006.01)
(52) U.S. Cl. .............................................. 713/2; 713/1
(58) Field of Classification Search .................... 713/1, 713/2, 100
See application file for complete search history.

(56) References Cited

U.S. PATENT DOCUMENTS

| | | | |
|---|---|---|---|
| 6,971,003 B1 * | 11/2005 | Mahmoud | 713/2 |
| 6,978,018 B2 * | 12/2005 | Zimmer | 380/30 |
| 2003/0115443 A1 * | 6/2003 | Cepulis et al. | 713/2 |
| 2004/0034764 A1 * | 2/2004 | Bulusu et al. | 713/1 |

* cited by examiner

*Primary Examiner*—Dennis M. Butler
(74) *Attorney, Agent, or Firm*—Joni D. Stutman-Horn

(57) ABSTRACT

A system and method is described that takes an existing operating system (OS) level driver and transforms it into a firmware extension, in one embodiment, for the extensible firmware interface (EFI). In one embodiment, an existing driver is stored in flash memory, without modification. When initializing the system, a mapping driver examines this image. Based on a determined image format and sub-type, it is known whether the existing driver is compatible with Linux, Windows, fcode, or another type. Based on the type, the mapping driver either fills in the blanks and maps directly to the EFI services, or rewrites some of the flash with binary (in memory). The driver is typically compressed when in flash memory. Once the OS is booted, the OS uses its own driver.

31 Claims, 3 Drawing Sheets

METHOD AND SYSTEM TO ENCAPSULATE A DRIVER WRITTEN FOR AN OPERATING SYSTEM (OS) RUNTIME ENVIRONMENT IN AN OS INDEPENDENT ENVIRONMENT FIRMWARE EXTENSION

FIELD OF THE INVENTION

An embodiment of the present invention relates generally to device drivers in a computing system and, more specifically, to leveraging device drivers to an extensible firmware interface (EFI) pre-boot environment from legacy runtime drivers.

BACKGROUND INFORMATION

Today, the pre-boot environment is characterized by initiating power to a given platform, and fetching a set of code from the platform firmware to commence boot in the processor. For an extensible firmware interface (EFI) compliant system, there is firmware in the flash part of the computing system that executes, and germinates an EFI operational environment. EFI is characterized by a set of boot services, including memory allocation, time, stall, and setting time. In addition, EFI is characterized by a set of protocols which are installable interfaces identified by globally unique identifiers (GUIDs), which are typically 128 bits long. The various protocol capabilities or services can be published for global use. For example, if the computing device has a USB (universal serial bus), there is a USB protocol that a driver will publish. In EFI, today, there is a class of image, or executable, called an EFI driver. An EFI driver is a portable executable, common object file format (PE/COFF) image. PE/COFF is similar to the image format used by Microsoft® Corporation for Windows™ drivers. The EFI 1.1 Specification has been released/defined to support EFI, and is currently available on the Internet at http://developer.intel.com/technology/efi.

Currently, for new hardware such as a new disk controller, for example, there is an abstraction to support communication with the disk, called the block input/output (I/O) protocol. For example, if a new disk controller chip is designed that communicates to a disk in a certain way, the chip vendor must write an EFI driver that would be a single PE/COFF binary image. This image is loaded by the system's EFI core and it would publish a block I/O protocol. This block I/O protocol defines read, write and reset services. This driver implements these particular services for the chip. If the chip needs to set a certain bit for a read, for instance, the driver provides a function to accomplish this operation. The driver abstracts the service, so there are things such as file system drivers that search for the block I/O protocol and can create a file system instance similar to the Microsoft File Allocation Table (FAT). This block I/O protocol is an abstraction allowing a software-only file system driver. The value in the abstraction is that a system can support various interfaces such as the small computer system interface (SCSI), integrated drive electronics (IDE), a block abstraction on USB, IEEE 1394, etc. It is under the purview of the particular driver writer how to support the read, write, and reset service for block I/O, for example. New or different hardware can be plugged in; all that is needed is a new driver.

EFI is a relatively new framework. The class of EFI compatible drivers in the market is smaller than legacy drivers. EFI compatible drivers have only been developed in the last few years. Device vendors are often not willing to develop EFI drivers when there are as yet only a small number of EFI compliant systems in use. The vendors want to keep their resources for developing drivers for systems that are shipped to 100,000 rather than 10,000 customers. Windows™ and GNU Linux have many existing drivers. Some of the success enjoyed by an OS is due to the number of compatible drivers that exist for various hardware platforms for running the OS.

The boot process for EFI compatible systems varies from a legacy system. Drivers are in abundance for the pre-boot phase of legacy systems running a basic input/output system (BIOS). EFI-compatible drivers are few. During pre-boot of EFI-compatible systems, the EFI must boot the OS. During pre-boot, the processor needs to know how to communicate with the hardware in order to complete the boot. The OS driver that knows how to communicate with the hardware, for instance a hard disk, cannot be used in the pre-boot stage in current systems.

BRIEF DESCRIPTION OF THE DRAWINGS

The features and advantages of the present invention will become apparent from the following detailed description of the present invention in which.

DETAILED DESCRIPTION

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Until vendors develop EFI-specific drivers, EFI-compatible systems will be limited in the selection of hardware devices that can be initialized during pre-boot. A system and method for transforming existing drivers into EFI-compatible pre-boot drivers is described herein. An encapsulation of the operating system (OS) vendor's driver is generated. The service calls for input and output of those drivers are mapped to an EFI service. The block I/O protocol may still be published as the external, callable interface, but how the block I/O abstractions are bound to a Linux driver, for example, are described herein. The file system driver recognizes a request for block I/O, but how the actual I/O operations are sequenced are in concert with a wrapper driver and an OS vendor's driver.

A large class of OS vendor drivers exist and can be used in the pre-boot environment by utilizing the system and method described herein. A mapping framework is wrapped around the existing drivers in an architecturally consistent fashion. Thus, the wrapping isn't exposed to higher level protocol consumers. A file system driver resides above a partition driver in the software stack, the partition driver expects to see a block abstraction, etc. The partition driver does not care how the block I/O requests are mapped. The mapping can be done in a consistent manner with current architecture.

Figure 1:
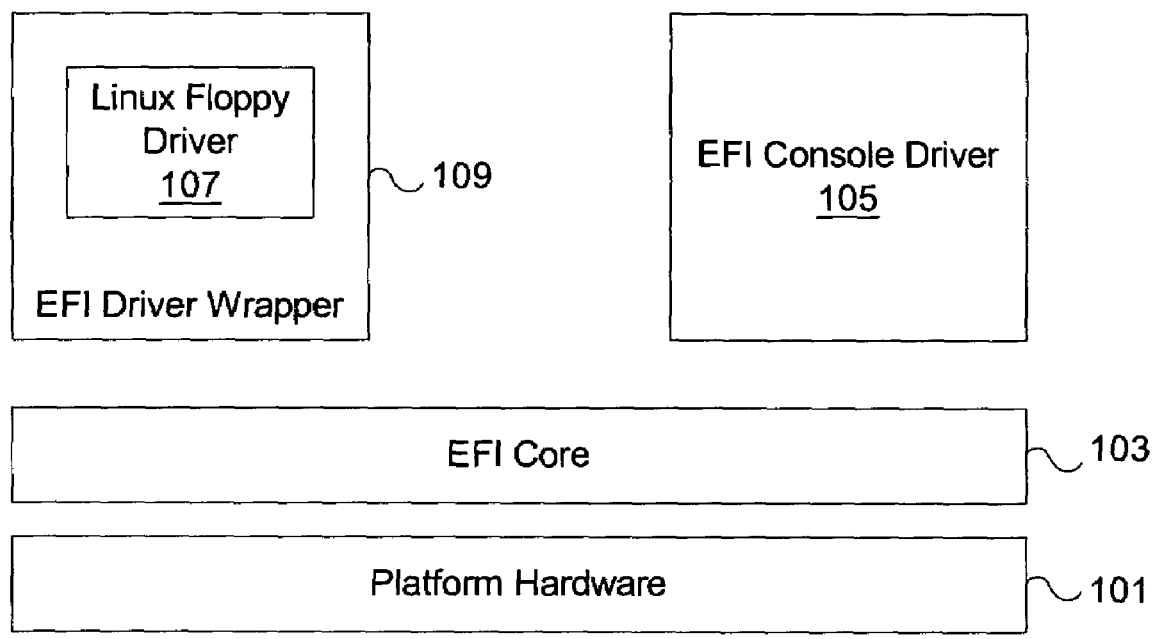
FIG. 1 is a block diagram of an exemplary EFI driver wrapper and its interaction with the platform hardware of an exemplary embodiment.

Referring now to the drawings, and in particular to FIG. 1, there is shown a block diagram of an exemplary EFI driver wrapper and its interaction with the platform hardware. The platform hardware 101 communicates with the EFI core layer 103. The console has an EFI compatible driver 105. The floppy driver on this exemplary system, however, does not have an EFI compatible driver. It has an existing Linux floppy driver 107. Since the floppy is a boot device, it is necessary to initialize and communicate with this device during pre-boot. Many non-boot devices do not require initialization during pre-boot, so pre-boot drivers are not necessary for such devices. For the exemplary Linux floppy driver 107, an EFI driver wrapper 109 is introduced as a layer between the EFI core and the Linux floppy driver 107. The EFI driver wrapper 109 provides alternate imports and exports and, if necessary, does binary rewriting of system calls. Windows™ and Linux are the two OS's predominantly used in today's market. Thus, there is typically an existing driver written for either Windows™ or Linux. In an exemplary embodiment, one EFI driver wrapper for both Windows™ and Linux is generated for a device.

In one embodiment, a Linux driver is wrapped for EFI pre-boot use. The selection of one runtime driver over another (for a different OS) is typically made due to its size or runtime efficiency. In some cases, Linux driver source code can be modified and linked with the EFI library. This cannot be done for source code which is protected by copyright and licensing restrictions.

In another embodiment the binary formats of existing drivers are taken from Windows™ or Linux. The system calls are intercepted and mapped to EFI service calls. To do this, one needs to know how to load the images. For instance, Windows™ and Linux drivers may not be in the same image format. There is a field in a PE/COFF image that describes the image as being, for instance, a Windows™ driver, EFI application, WIN32 application, EFI driver, or Win/CE driver. The PE/COFF is a standard image format with code and data sections, and is easily parsed to determine its type. The image is self-describing.

In one embodiment, an EFI wrapper is generated by taking legacy drivers and mapping services for reading/writing to services that will work with the EFI interface. For example, assume the OS has a method for performing operation X. For example, operation X may be a read from a block device operation. This operation is mapped to the EFI reading/writing disk operation. When running, the OS block IO call is intercepted and the call is mapped to a block IO. A semantically similar API (application programming interface) is provided.

Table 1, below, shows a comparison of driver services and protocols that may be used for different systems. Each device driver or firmware extension has a number of associated attributes such as: image type, subsystem type, exposed service, file name, and member service. The system and method, as described herein, identifies the image type of the driver and maps its services to an EFI compatible firmware extension. This allows the runtime driver to be used during pre-boot, with an EFI system.

TABLE 1

Comparison of services and protocols for various systems

| | EFI | NT | Linux |
| --- | --- | --- | --- |
| Image Type | PE/COFF | PE/COFF | Elf |
| Subsystem type | EFI driver | Windows | N/A |
| Exposed service | Boot services | NT_server | Sys services |
| File name | Pci.efi | Hal.dll | MACRO |
| Member service | PciIoProtocol::Iowrite( ) | Registerwrite( ) | _ia64_outb |

In one embodiment, a reference to the OS service is replaced with a reference to the EFI service. In one embodiment, the service call is replaced, or overloaded, with binary remapping. In another embodiment, the registry has a list of drivers. The name of a driver in the registry is changed to accommodate a pre-boot driver. In effect, this creates a space-efficient verisimilitude of the OS-present environment in the pre-OS firmware space.

With regard to binary mapping, suppose there is a library that performs the services and there is an NT-specific service foo. The foo service is rewritten to be an EFI-specific service foo. The binary for the NT-specific service foo is overwritten with the EFI-specific service foo. Binary mapping is well known in the art. It is similar to the DOS utility debug which was used to edit object and binary files by writing over operations with substitute operations, and/or jump codes to patch code.

Figure 2:
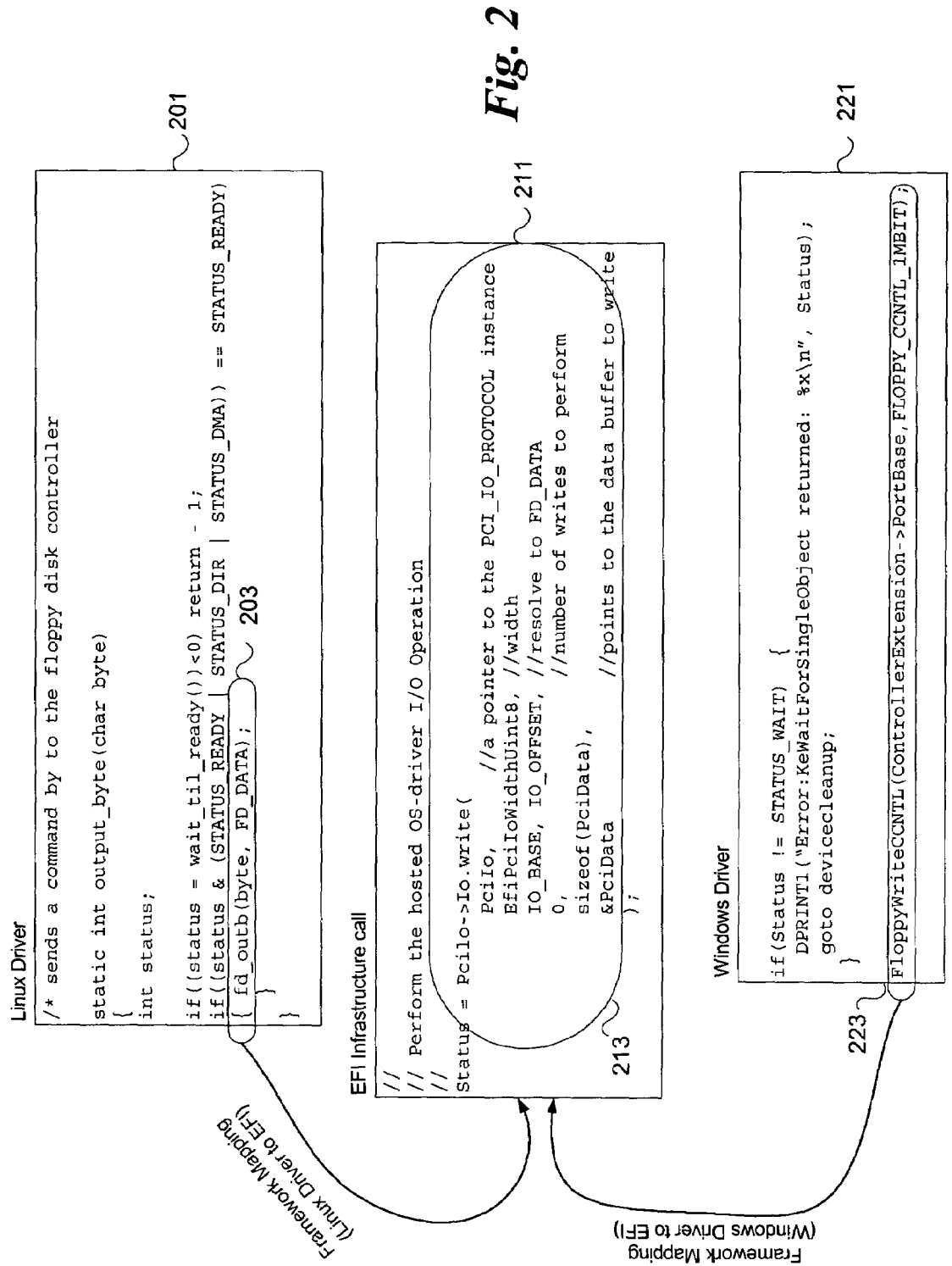
FIG. 2 is block diagram illustrating an exemplary framework mapping from both a Linux driver and Windows driver to an EFI infrastructure call.

Referring now to FIG. 2, there is shown an illustration of the framework mapping from both a Linux driver and Windows driver to an EFI infrastructure call. This exemplary framework shows the calls for a floppy disk controller. A Linux driver 201 may use the fd_outb function 203 for block I/O. It may be associated with a binary rewrite which maps to a PciIo->Io.write function 213 in an EFI infrastructure 211. Similarly, a Windows™ driver 221 floppyWriteCNTL function 223 may map to the EFI PciIo->Io.write function 213, as well. In other words, the Windows™ driver hal.dll registerwrite( ), as shown in Table 1, is mapped to the EFI driver PCI_IO_Protocol::IOwrite( ).

In one embodiment, a dynamically linked library is designed to call a specific service. The OS knows the service and fills in the address with the EFI service instead. In another embodiment, the service is statically linked, such as glibc in Linux, and is called through another layer. In this case, the service is binary rewritten for an actual call or for filling in an import/export table.

The present system and method is not limited to service calls in Windows™ or Linux drivers. In one embodiment, a binary image is written for one system and then mapped to another. For example, IEEE1275, the open firmware architecture used on Sun Microsystems Corp. and Apple Computer machines for boot, may be written. Additional information regarding the open firmware architecture is currently available on the Internet at http://playground.sun.com/pub/p1275/. Open firmware drivers are typically written in high-level language such as Forth. This layer can be augmented to understand fcode and map an option-ROM to EFI. Fcode is typically used for Apple Macintosh and Sun Microsystems systems.

The OS drivers have an expectation of being relocated from their link-time address. The OS drivers typically run in virtual mode during the OS, but they run in physical mode during the pre-OS, firmware regime. This is acceptable since any "virtual-mapping" services that the OS driver may request, such as mapping from a virtual to physical address, is trivial in the pre-OS state because these addresses are identical (i.e., Virtual-to-Physical mapping is always 1—1 when executing in physical mode).

Figure 3:
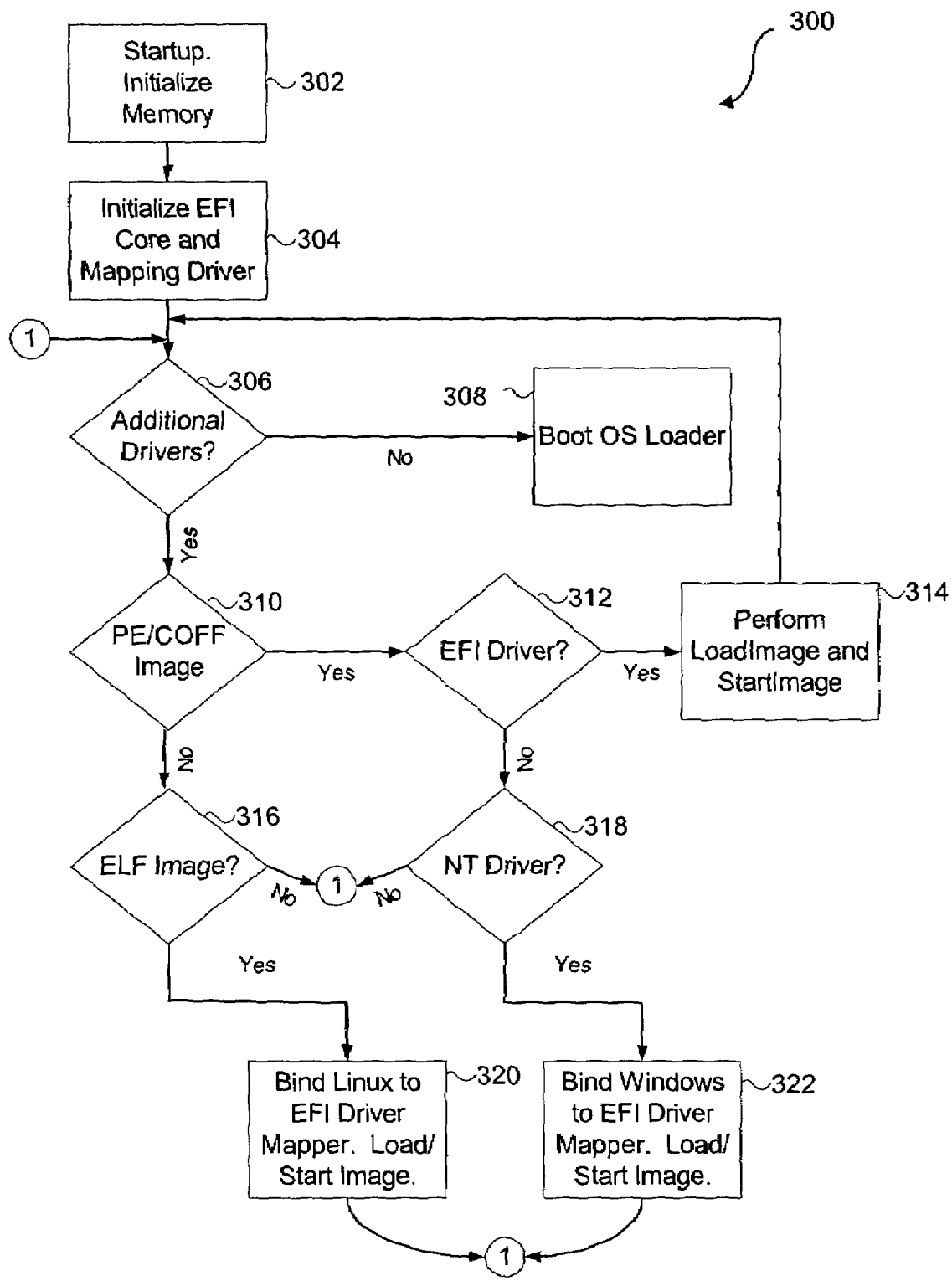
FIG. 3 is a flow diagram of an exemplary method for utilizing an EFI firmware extension wrapper.

Referring now to FIG. 3, there is shown a flow diagram of an exemplary method 300 for utilizing an EFI firmware extension wrapper, as described herein. Upon system startup, the memory is initialized in block 302. The EFI core and mapping driver(s) are initialized in block 304. A determination is made in block 306 as to whether there are additional drivers that must be loaded during pre-boot. If not, then the operating system loader is booted in block 308. If there are additional drivers, then a determination of the type of driver found is made in blocks 310, 312, 316 and 318. The image type is read from the image header. If the image is of type PE/COFF as determined in block 310, then a determination is made as to whether the driver is already in EFI format in block 312. If so, then the image is loaded and started in block 314. If the PE/COFF image is not EFI compatible, a determination is made as to whether it is a NT kernel mode image, i.e., Windows™, in block 318. If it is a Windows™ image, then the driver is bound to the EFI driver mapper and the image is loaded and started in block 322.

If the image is not PE/COFF, a determination is made as to whether it is an ELF image used for Linux in decision block 316. If so, then the Linux driver is bound to an EFI driver mapper and loaded and started in block 320. If the image type is not recognized, the process looks for additional driver images. It will be apparent to one of ordinary skill in the art that further determinations may be made for binding fcode or other drivers in addition to the Linux and Windows™ drivers. The process continues until all drivers have been bound, loaded and started.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action or produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for using runtime drivers during pre-boot, comprising:
   booting a computing system;
   initializing memory in the computing system;
   initializing at least one pre-boot mapping driver;
   for each device requiring pre-boot operation, identifying whether the device's driver is a runtime driver needing to be mapped to a pre-boot driver; and
   for each identified runtime driver,
      binding the identified runtime driver to a pre-boot mapping driver to generate a mapped runtime driver image;
      loading the mapped runtime driver image; and
      starting the mapped runtime driver image.

2. The method as recited in claim 1, wherein the pre-boot mapping drivers are compatible with an extensible firmware interface (EFI).

3. The method as recited in claim 1, wherein the runtime drivers are selected from a group consisting of Windows™ drivers, Linux drivers, fcode drivers, and EFI drivers.

4. The method as recited in claim 1, wherein identifying whether the driver is a runtime driver needing to be mapped to a pre-boot driver, comprises:
   accessing a header section of a runtime image; and
   determining an image type and subsystem type associated with the runtime image, wherein if the subsystem type is EFI then mapping is not performed.

5. The method as recited in claim 1, further comprising booting an operating system (OS) loader.

6. The method as recited in claim 1, wherein the pre-boot driver is a firmware extension.

7. The method as recited in claim 1, wherein binding the identified runtime driver comprises binary rewriting of system calls.

8. The method as recited in claim 1, wherein binding the identified runtime driver comprises:
 intercepting system calls; and
 mapping the system calls to service calls compatible with the pre-boot infrastructure.

9. The method as recited in claim 8, wherein the pre-boot infrastructure is an extensible firmware interface (EFI).

10. The method as recited in claim 1, wherein a runtime driver to be used as a pre-boot driver is selected based on size and efficiency of the runtime driver.

11. An article of manufacture comprising a machine accessible storage medium containing code having instructions that when executed during pre-boot, cause the machine to:
 initialize memory in the computing system;
 initialize at least one pre-boot mapping driver;
 for each device requiring pre-boot operation, identify whether the device's driver is a runtime driver needing to be mapped to a pre-boot driver; and
 for each identified runtime driver,
  bind the identified runtime driver to a pre-boot mapping driver to generate a mapped runtime driver image;
  load the mapped runtime driver image; and
  start the mapped runtime driver image.

12. The article as recited in claim 11, wherein the pre-boot mapping drivers are compatible with an extensible firmware interface (EFI).

13. The article as recited in claim 11, wherein the runtime drivers are selected from a group consisting of Windows™ drivers, Linux drivers, fcode drivers, and EFI drivers.

14. The article as recited in claim 11, wherein identifying whether the driver is a runtime driver needing to be mapped to a pre-boot driver, comprises:
 accessing a header section of a runtime image; and
 determining an image type and subsystem type associated with the runtime image, wherein if the subsystem type is EFI then mapping is not necessary.

15. The article as recited in claim 11, wherein the code further comprises instructions that boot an operating system (OS) loader.

16. The article as recited in claim 11, wherein the pre-boot driver is a firmware extension.

17. The article as recited in claim 11, wherein binding the identified runtime driver comprises binary rewriting of system calls.

18. The article as recited in claim 11, wherein binding the identified runtime driver comprises instructions that:
 intercept system calls; and
 map the system calls to service calls compatible with the pre-boot infrastructure.

19. The article as recited in claim 18, wherein the pre-boot infrastructure is an extensible firmware interface (EFI).

20. The article as recited in claim 11, wherein a runtime driver to be used as a pre-boot driver is selected based on size and efficiency of the runtime driver.

21. A system comprising:
 platform hardware comprising a processor coupled with system memory and pre-boot memory;
 an extensible firmware interface (EFI) core infrastructure to enable communication among the processor and a plurality of hardware devices coupled to the platform hardware;
 at least one hardware device driver, wherein the at least one hardware device driver is required during pre-boot; and
 an EFI driver wrapper to enable the at least one hardware device driver to operate during pre-boot.

22. The system as recited in claim 21, wherein a hardware device driver designed for a runtime environment is associated with the EFI driver wrapper using binary rewriting.

23. The system as recited in claim 21, wherein a hardware device driver designed for a runtime environment is associated with the EFI driver wrapper using system call remapping.

24. A method for mapping a driver for use in an alternative operational environment, comprising:
 booting a computing system;
 initializing memory in the computing system;
 initializing at least one alternative operational environment mapping driver;
 for each device requiring alternative operational environment operation, identifying whether the device's driver is a driver needing to be mapped to a alternative operational environment driver; and
 for each identified driver needing mapping,
  binding the identified driver to an alternative operational environment mapping driver to generate a mapped driver image;
  loading the mapped driver image; and
  starting the mapped driver image.

25. The method as recited in claim 24, wherein the mapping drivers are compatible with an extensible firmware interface (EFI).

26. The method as recited in claim 25, wherein the drivers are selected from a group consisting of Windows™ drivers, Linux drivers, fcode drivers, and EFI drivers.

27. The method as recited in claim 25, wherein identifying whether the driver is a driver needing to be mapped to an alternative operational environment driver, comprises:
 accessing a header section of a driver image; and
 determining an image type and subsystem type associated with the driver image, wherein if the subsystem type is EFI then mapping is not performed.

28. The method as recited in claim 24, further comprising booting an operating system (OS) loader.

29. A system comprising:
 platform hardware comprising a processor coupled with system memory and pre-boot memory;
 a core infrastructure to enable communication among the processor and a plurality of hardware devices coupled to the platform hardware;
 at least one hardware device driver, wherein the at least one hardware device driver is required during a first operational execution environment; and
 a driver wrapper to enable the at least one hardware device driver to operate during an alternative operational execution environment.

30. The system as recited in claim 29, wherein a hardware device driver designed for the first operational execution environment is associated with the driver wrapper using binary rewriting.

31. The system as recited in claim 29, wherein a hardware device driver designed for the first operational execution environment is associated wit the driver wrapper using system call remapping.

* * * * *